US008326574B2

(12) United States Patent
Hogebrink

(10) Patent No.: US 8,326,574 B2

(45) Date of Patent: Dec. 4, 2012

(54) PROGRAMMABLE DEVICE FOR ISSUING ALERT SIGNALS AS A REMINDER TO PERFORM A RECURRING ACT

(75) Inventor: Bart Theodoor Hogebrink, Amsterdam (NL)

(73) Assignee: IniVention B.V., Amsterdam (NL)

( * ) Notice: Subject to any disclaimer, the term of this patent is extended or adjusted under 35 U.S.C. 154(b) by 363 days.

(21) Appl. No.: 12/721,435

(22) Filed: Mar. 10, 2010

(65) Prior Publication Data

US 2010/0235139 A1 Sep. 16, 2010

Related U.S. Application Data

(60) Provisional application No. 61/262,132, filed on Nov. 17, 2009.

(30) Foreign Application Priority Data

Mar. 11, 2009 (EP) .................................... 09075133

(51) Int. Cl.
*G04F 3/00* (2006.01)
*G06F 19/00* (2011.01)

(52) U.S. Cl. .................. 702/177; 340/309.7; 340/568.1; 368/89; 368/109; 368/245; 700/306

(58) Field of Classification Search ............. 340/286.01, 340/309.16, 309.7, 384.1, 500, 540, 568.1, 340/815.4; 368/89, 107, 108, 109, 243, 244, 368/245; 702/127, 176, 177; 713/1, 100
See application file for complete search history.

(56) References Cited

U.S. PATENT DOCUMENTS

| | | | | | |
|---|---|---|---|---|---|
| 4,362,392 | A | * | 12/1982 | Kumata | 368/82 |
| 4,490,711 | A | | 12/1984 | Johnston | |
| 4,588,303 | A | * | 5/1986 | Wirtschafter et al. | 368/10 |
| 4,682,299 | A | * | 7/1987 | McIntosh et al. | 702/177 |
| 4,725,999 | A | * | 2/1988 | Tate | 368/10 |
| 4,831,562 | A | * | 5/1989 | McIntosh et al. | 702/177 |
| 4,837,719 | A | * | 6/1989 | McIntosh et al. | 702/177 |
| 4,942,544 | A | * | 7/1990 | McIntosh et al. | 702/177 |
| 4,970,669 | A | * | 11/1990 | McIntosh et al. | 702/177 |
| 5,020,037 | A | * | 5/1991 | Raven | 368/10 |
| 5,088,056 | A | * | 2/1992 | McIntosh et al. | 702/177 |
| 5,097,429 | A | | 3/1992 | Wood et al. | |
| 5,099,463 | A | * | 3/1992 | Lloyd et al. | 368/10 |
| 5,220,540 | A | * | 6/1993 | Nishida et al. | 368/41 |
| 5,289,157 | A | * | 2/1994 | Rudick et al. | 340/309.7 |
| 5,852,590 | A | | 12/1998 | De La Huerga | |

(Continued)

FOREIGN PATENT DOCUMENTS

GB 2344194 A 5/2000

(Continued)

*Primary Examiner* — Edward Cosimano

(57) ABSTRACT

A method for issuing alert signals as a reminder to perform a recurring act. The method comprises providing a device with a programmable electronic circuit, an electrical power source, a control switch, and an alert body controlled by the electronic circuit, programming the device with a signaling pattern, determining a first alert time based at least in part on the signaling pattern, issuing a first signal from the alert body, issuing a second signal from the alert body at the first alert time, the second signal being different from the first signal, and determining a next alert time upon activation of the control switch, wherein the next alert time is based at least in part on the signaling pattern and the time elapsed between the first alert time and activation of the control switch.

14 Claims, 2 Drawing Sheets

U.S. PATENT DOCUMENTS

| | | | | |
|---|---|---|---|---|
| 5,995,938 | A | 11/1999 | Whaley | |
| 6,018,289 | A | 1/2000 | Sekura | |
| 7,978,564 | B2 * | 7/2011 | De La Huerga | 368/10 |
| 8,111,586 | B2 * | 2/2012 | Scott et al. | 368/22 |
| 8,218,403 | B2 * | 7/2012 | Scott et al. | 368/244 |
| 8,284,633 | B2 * | 10/2012 | Lazaridis et al. | 368/109 |
| 2001/0028308 | A1 * | 10/2001 | De La Huerga | 340/573.1 |
| 2009/0279392 | A1 * | 11/2009 | Scott et al. | 368/72 |
| 2009/0281835 | A1 * | 11/2009 | Patwardhan et al. | 705/3 |
| 2009/0294521 | A1 * | 12/2009 | de la Huerga | 235/375 |
| 2010/0085841 | A1 * | 4/2010 | Lazaridis et al. | 368/73 |
| 2010/0091615 | A1 * | 4/2010 | Scott et al. | 368/21 |
| 2012/0134240 | A1 * | 5/2012 | Scott et al. | 368/21 |
| 2012/0250470 | A1 * | 10/2012 | Scott et al. | 368/244 |

FOREIGN PATENT DOCUMENTS

| | | | |
|---|---|---|---|
| GB | 2352841 | A | 2/2001 |
| WO | 9211587 | A1 | 7/1992 |
| WO | 9938052 | A1 | 7/1999 |

* cited by examiner

PROGRAMMABLE DEVICE FOR ISSUING ALERT SIGNALS AS A REMINDER TO PERFORM A RECURRING ACT

This application claims priority from European patent application no. 09075133.0 filed on Mar. 11, 2009, and expired U.S. provisional application No. 61/262,132 filed on Nov. 17, 2009. The contents of both applications are hereby incorporated by reference in their entirety.

BACKGROUND OF THE INVENTION

1. Field of the Invention

The present invention relates to a programmable device for issuing reminder signals, in particular for issuing an alert signal to remind the user to perform a recurring act.

2. Description of the Related Art

In healthcare, making sure patients take the right medication at the right time is a major challenge. Many people are struggling to comply with their medical prescription, especially when multiple types of medications should be taken with different patterns of intake times. Especially for the elderly, who often suffer a degrading short-term memory and easily forget whether or not they already took their medication, this is a serious problem. Since especially the elderly often need to take multiple types of medication with different intake patterns, errors in proper administration are hard to avoid.

There are many concepts and devices to assist with patient medication compliance and/or other health related factors. However, these devices lack the combination of being low-cost, easy to use and having a rich feature set. For example, U.S. Pat. No. 6,018,289 discloses a programmable prescription compliance device, but suffers from several shortcomings:

- it has a limited choice in dosing schedules (supports only commonly prescribed medication taking regimens);
- the functionality of the computer interface is limited to the use of an external device (e.g. PC) to select and program one of the supported regimens, and cannot be used to create an alternative regimen;
- it is not designed to handle the problem of a disturbed medication intake schedule when users travel to another time zone while taking medications;
- the intake times are calculated based on only three factors (first intake time, interval between doses, and acceptable time range to take the medication) and thus provides no support for patients that have an irregular lifestyle and yet need to take their medication at a specific period before or after their meals;
- it has no means to automatically recalculate a next intake time to prevent a dose that is too low or too high in case of the patient taking medication too early or too late; and
- it is not designed to support alternative uses and applications.

Accordingly, there is a need for a personal event reminder device without these shortcomings.

SUMMARY OF THE INVENTION

The invention seeks to address these shortcomings according to various embodiments. According to one aspect, the invented device can keep a record of the level of compliance of the patient by recording the times at which the patient takes the medication, because at this point in time the patient is supposed to operate a switch, for example a button, and the device includes means to record this time of operation. This record of operation times can later be read out by the physician, who can use this insight in the patients' level of compliance to advice the patient and/or to alter the medication schedule. Moreover, the invented device is capable of altering a future alert time based on the programming, and the calculated difference in time between the scheduled time of acting (the alert signaling time) and the actual registered time of acting (the time the patient operated the switch to confirm the act has been performed). This can for example prevent a dose that is too high, like it could occur if, for example, the patient is one hour late at taking the medication that was scheduled at 10:30 AM, and thus takes the morning dose at 11:30 AM, but yet takes the next dose only half an hour later, at the prescheduled time of 12:00 PM. In this example, the invented device could automatically postpone the afternoon dose by, for example, one hour, to 01:00 PM, and thus preventing the patient from taking two doses of medication in only a half hour time span, instead if the intended one and a half hour time span.

Another object of this invention is to provide a low cost, easy to use and highly customizable programmable alert device, which can be used for various applications. Other objects and advantages will become apparent from a consideration of the description in this application.

The present invention may have one or more of the following advantages:

- Because it is small and it has only a few inexpensive parts, it is less costly;
- Because it is compact and requires no physical connections for data transfer, it can be made more robust;
- Having only one button to operate, it is easier to use, especially for people who are physically and/or mentally challenged;
- Because it features both an audible alert signal, and a visual alert signal, it can be used also by deaf or blind people;
- Because textual information is not essential for communicating with the user, it can be made language independent and can be used by illiterate people e.g. small children;
- For some medications, it is advantageous for the patient to follow a dosing schedule that gradually increases the doses during an initial phase, whilst gradually reducing the dose during the final phase of the intake schedule. The present invention supports this and other custom schedules, because it allows the physicist to fully customize the alert schedule;
- In the prior art examples that include an interface with an external PC, the use of this interface is limited to feeding the device with the data that is required for the software on the device to run a personalized schedule, and/or reading out user and usage data. In the present invention, the interface with the external PC is not limited to these uses, but can also be used to replace the software running on the device. This greatly extends the scope of its abilities, applications and uses;
- The devices disclosed in the prior art, have no convenient way to handle the situation of the patient travelling to an area in a different time zone. Usually the patient gradually adepts to this new situation, but the medication alert device does not adept its schedule, causing an unfavorable disturbance in the medication intake schedule and the patients daily life. The invented device has a feature to handle such a situation more smoothly to prevent such a disturbance;
- The invented device can be programmed in such a manner that can assist a patient in taking his or her medication at a preset time before or after a meal;

It can also be programmed to automatically alter one or more future alert times to prevent a dose that is too high or too low when the patient fails to follow the prescribed intake schedule accurately (see description for a more complete explanation);

It is designed to be reprogrammable, so the hardware can remain the same while new or updated software can extend or replace its initial functionality.

There is therefore need for a device of the type mentioned in the introduction which can be helpful to take medicines or for performing similar repetitive acts according to a schedule. This objective is achieved by the device according to the invention.

The present invention comprises a programmable electronic circuit, an electrical power source and an alert body controlled by the electronic circuit, and a control switch, wherein the electronic circuit includes at least a computer interface, a real time clock and a programmable memory.

For example, as shown in FIG. 3, which is a schematic diagram of functions performed by the claimed method and programmable device for issuing alert signals 100, at the time the medicines are given to the patient, the device is programmed 105 by the prescribing doctor or pharmacist and stuck on the medicine container. The programming activity takes place by means of a personal computer (PC) or a similar device with is connected through the computer interface to the device of the invention. Through programming, a set of alert times at which the medication should be taken, are stored in the device. At any time there is a next alert time that, at that moment, is the relevant alert time 110. This applies until the last programmed alert time has been handled. As long as the relevant alert time has not yet been reached, the alert device issues a first signal 115, indicating that no medicines should be taken. When the relevant alert time is reached, the device issues a second signal 120. This signal notifies the patient that the time for taking the medication has been reached. Immediately after taking the medication, the patient operates 125 the switch, after which the second signal is deactivated and a new relevant alert time is determined 130 and set as programmed. The alert body is now signaling the first signal 115 until the next relevant alert time has been reached, after which the device changes the signal to the second signal 120. This process can be repeated as often as desirable.

In a very simple implementation of the invention, a number of signaling times are determined by means of the PC and then transferred to the memory of the device. It is however also possible that the device is programmed via the PC with parameters that are set by the doctor/pharmacist to follow the desired course of drug intake. This way, almost every intake pattern is feasible with the device according to the invention. For example, the daily or weekly dose can be made dependent on the time at which the user takes the medication. During an initial phase, the dose can be gradually increased whilst the dosing can be gradually reduced during the final phase of the intake schedule. The degree of change in the dosage during initial phase and the final phase can preferably be set with a limited number of parameters, or even a single parameter that is set by the doctor/pharmacist.

In a very simple and economic implementation, the switch is a push-button switch and the alert body is a LED (Light Emitting Diode). The switch may alternatively be implemented as a touch-operated switch. The first signal from the LED could be a slowly flashing signal and the second signal a fast blinking signal. In this implementation it is also possible to use a two-color LED, so the first and second signals have a different color.

In a preferred implementation of the device according to the invention, the alert body comprises two LEDs, each of a different color, for example, a red and a green LED, to make it suitable for colorblind users as well. This way, the first signal could for example consist of the red LED flashing with a certain interval. This is the sign that the device is activated, so the program runs, but the relevant alert time has not yet arrived. This tells the user that the device is in operation, but that the prescribed drug intake time has not yet arrived. At the relevant alert time, the red LED turns off and the green LED starts to flash. This is the signal for the user that the drug should be taken. After taking the drug, the user presses the button and a new alert time is determined according to the imported alert times or according to the entered parameters.

In a preferred implementation of the device according to invention, the time at which the switch is operated, and hence the intake time, is stored in the device's memory. This way, the time of intake can be read out by the physician on a PC. This allows the physician to get insight in the level of compliance of the patient.

In another preferred implementation of the device according to the invention, the nature of the signs changes while the user fails to respond to the alert signal that an act must be performed. For example, the green LED could start flashing more rapidly and ultimately be continuously lit.

In a preferred implementation of the invention, the alert body is capable of issuing an audible signal, e.g. by means of a piezo-electric buzzer, that can be activated in the event that some time after the expiry of the relevant signaling time, the button still has not been pressed. In that case, the buzzer could be useful as a means of drawing the attention of the user.

In a preferred implementation of the device according to the invention, the device includes a wirelessly programmable RFID (Radio Frequency IDentification) chip. One example of a suitable programmable electronic circuit is the CPK082 programmable ASIC (application-specific integrated circuit) made by CYPAK (cypak.com). However, other usual communication means may be included in the device according to the invention, e.g. infrared communication, Bluetooth, Near Field Communications (NFC) or cable communications.

The device according to the invention has a prolonged lifespan if the power source is rechargeable. Preferably, the charging is contactless, for example inductive, or by means of a solar panel.

For increased security, access to the device for programming and readout of the memory can be protected by a code.

To avoid confusion, a readable identification can be both printed on the device and stored in its memory.

In addition, the user friendliness is increased when simple instructions such as the meaning of the signals, are shown on the substrate of the device.

The device can be built out of mainly thin and flexible components. This will allow the device to be attached to objects of many different shapes. An implementation as a sticker has special preference. The device can then for example be attached to medication bottles or pillboxes, etc., of almost any shape and size.

BRIEF DESCRIPTION OF THE DRAWINGS

The invention will now be further illustrated by a description of an example of a preferred implementation of the present invention, with reference to the attached drawings, in which.

DESCRIPTION OF ILLUSTRATIVE EMBODIMENTS

The following is a description of certain embodiments of the invention, given by way of example only.

Figure 1:
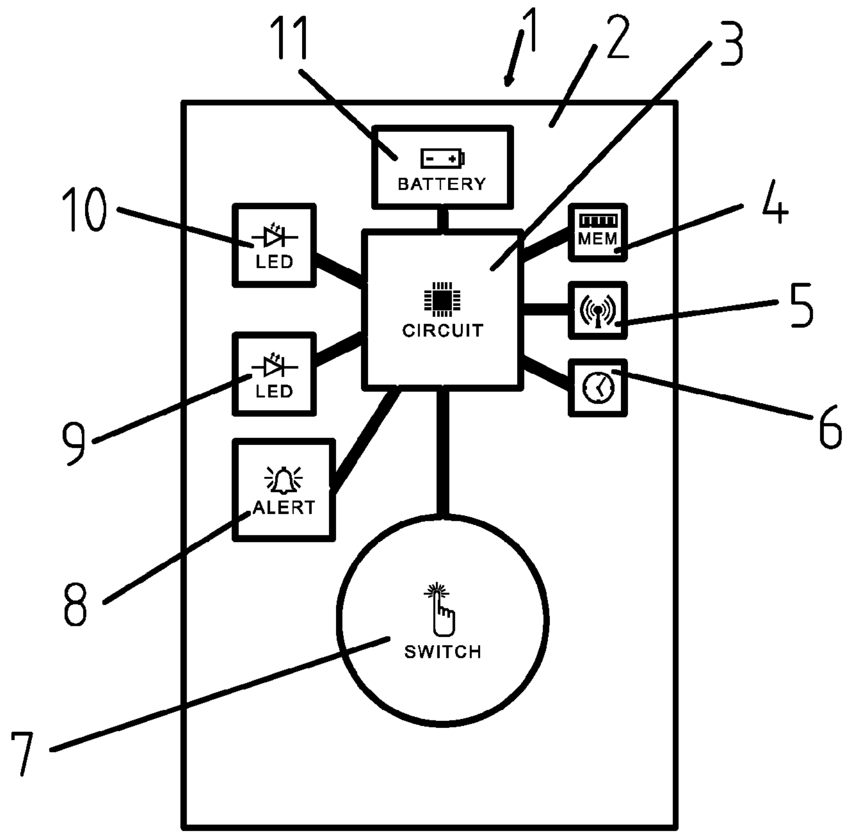
FIG. 1 is a schematic representation of a device according to the invention showing the major components.
Figure 2:
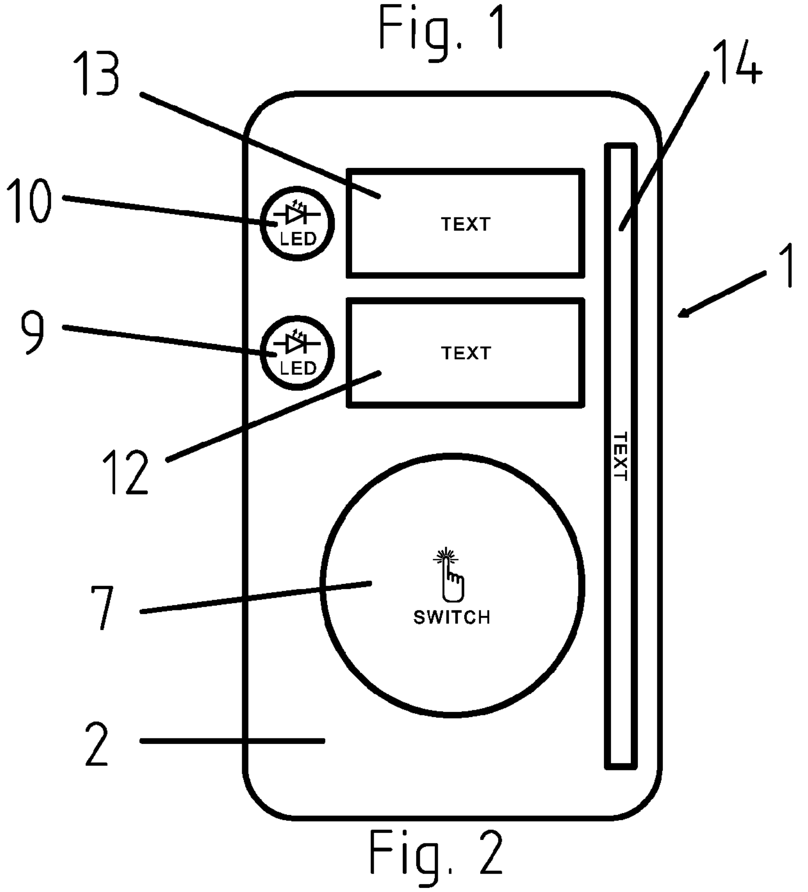
FIG. 2 is a view of an example of an implementation of a device according to the invention, as seen by a user.
Figure 3:
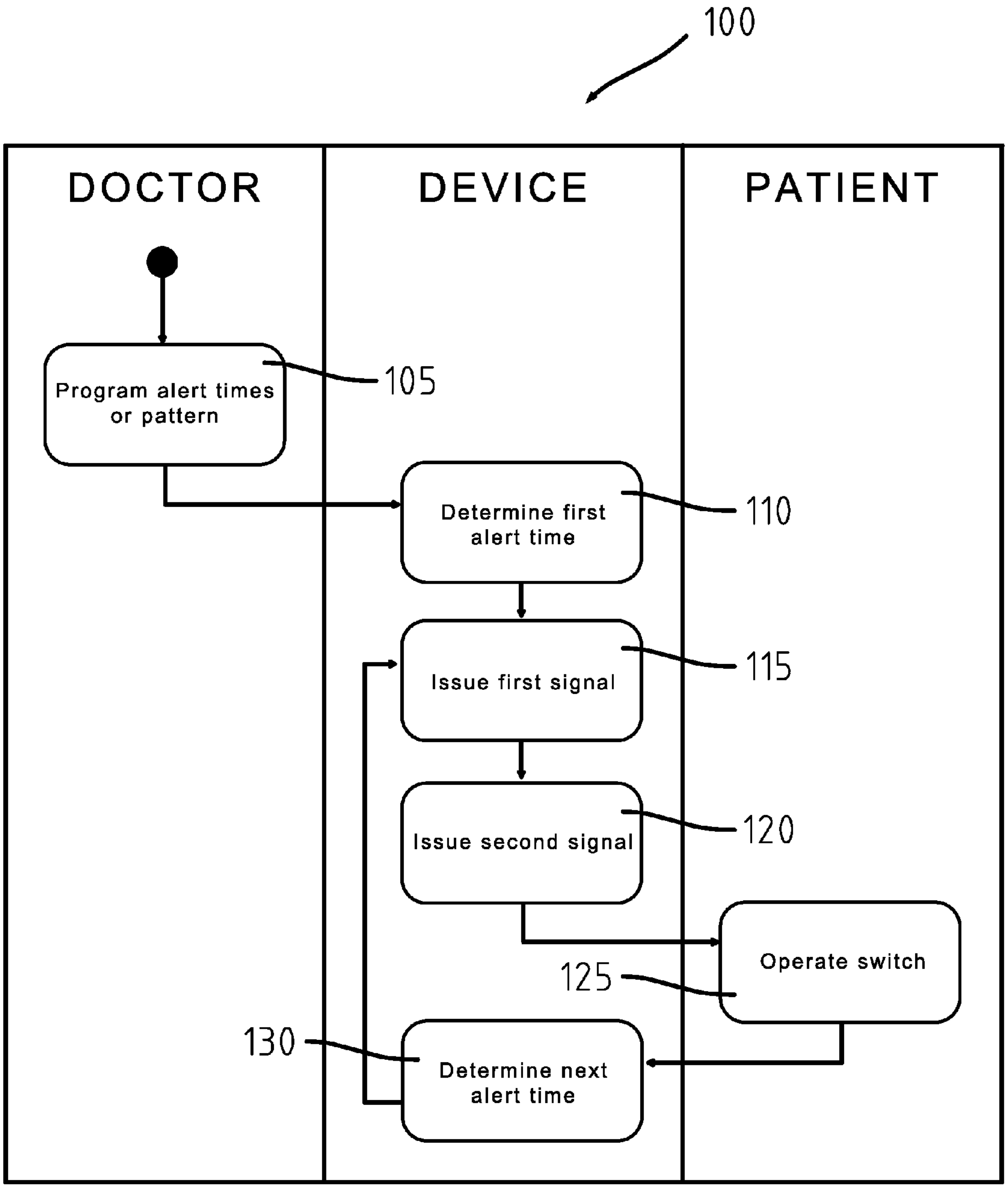
FIG. 3 is a schematic diagram of functions performed by the claimed method and programmable device for issuing alert signals.

FIG. 1 is a schematic representation of a device 1 according to the invention with the major components and FIG. 2 is a view of an example of an implementation of a device 1 according to the invention, as seen by a user.

Device 1 comprises a flexible substrate 2 on which a programmable electronic circuit 3 is displayed. Programmable electronic circuit 3 is connected with memory 4, transmitter/receiver 5, LEDs 9 and 10, a switch operated by a switch 7, real-time clock 6 and alert body 8. Transmitter/receiver 5 is part of the computer interface. Power supply is provided by battery 11. The electrical wiring of battery 11 to the different components is not shown to keep FIG. 1 simple. All components are firmly attached to/integrated in a flexible substrate 2. Transmitter/receiver 5 includes conversion means so that information from programmable electronic circuit 3 can be sent, and information received by transmitter/receiver 5 can be processed by programmable electronic circuit 3. Programmable electronic circuit 3 is connected to LEDs 9, 10 and can control the LEDs to emit light. LED 9 may emit green light, and LED 10 may emit red light. Programmable electronic circuit 3 is also connected to alert body 8 and can control the alert body to issue an audible signal. When switch 7 is operated, this is detected by programmable electronic circuit 3.

In FIG. 2 is a view showing a device 1 according to the invention, as seen by a user. In addition to the components named earlier, device 1 has text blocks 12, 13 and 14. Text block 12 may depict the word 'TAKE', text block 13 may depict the word 'WAIT', and text block 14 may depict a readable identification.

In memory 4, a control program is stored that is executable by programmable electronic circuit 3 and can be programmed with data and a set of parameters through transmitter/receiver 5 by an external programming unit that is not shown, for example a personal computer (PC) with a compatible transmit/receive unit. This programming is performed by, for example, the prescribing physician or the pharmacist who supplies the medications. Through the interface with the computer (in the example the transmitter/receiver 5 can communicate with a compatible transmitter/receiver connected to a computer) the physician or pharmacist gains access to the electronic circuit 3, 4, and 5 of device 1. This access may be protected by a code. Then the relevant data, containing at least the time schedule for taking the medications, is send to memory 4, where it is stored. These rules can have several parameters, which not only determine the alert times, but also whether, and to what extent the next intake time changes when the actual time of operation/intake differs from the scheduled alert time. When the control switch is not operated within a predetermined time after the alert time, such as when the user forgets to take the medicine or takes it earlier than prescribed, the signaling schedule can be changed in conjunction therewith. For example, the next alert time can be postponed or advanced. Also, the quantity of medications on that particular day can be adjusted temporarily to prevent a dose that is too high or too low. When, for example, a user is an hour late with taking the medicine, the following alert could be automatically postponed by half an hour. After programming, the device is ready for use. The device may be attached to the medicine container after the programming, but alternative places that the patient regularly visits could also be suitable for attachment, such as a minor or a computer monitor or a refrigerator.

Apart from entering medication intake times, other useful data can be stored in the memory of the device according to the invention and/or may be entered by the doctor/pharmacist via the PC, such as:

name and any other information regarding the patient
relevant medicine
name of doctor and/or pharmacist
code to protect access to the memory
identification of authorized readout and programming equipment After the programming has been completed, programmable electronic circuit 3, as a result of the schedule that was programmed, will control the red LED 10 in such a manner that it flashes with a slow interval. This is a sign that the device is programmed and thus activated, but that the medicine intake time has not yet arrived. When the time has arrived to take the medicine, then LED 10 turns off and thus stops flashing, and the green LED 9 starts to flash slowly. If the user sees this, he/she knows that it is time to take the medicine, and that the user should operate switch 7 while taking the medicine.

If a predetermined time expires and the user has not yet taken the medicine, then the green LED 9 flashes with gradually increasing speeds until finally green LED 9 is lit continuously. What happens when the user forgets to take the medicine depends on the prescription of the physician or pharmacist. It may be set so that green LED 9 is lit until the medicine is taken and the switch 7 is pressed, but it may also be advantageous for a certain medicine to skip this intake. In this case, after some time the green LED 9 shuts down and a new intake time is determined. Until that time the red LED 10 flashes again. There has been no record of intake (see below) and this skipping by the user is can later be observed during a read-out by the physician/pharmacist.

If the user has taken the medicine on time, he/she presses switch 7 and the device 1 stores the time of intake into memory 4 and sets a new intake time. The green LED 9 is turned off and the red LED 10 flashes slowly again. A new cycle has started.

If desired, the physician/pharmacist can read out the intake time data through the programming unit.

An embodiment of a device 1 according to the invention could feature an alert body 8 that, besides control LEDs 9 and 10, could also issue an audible signal, e.g. by means of a piezo-electric speaker, or it could be equipped with the ability to send signals to an external device, for example, through Bluetooth or Near Field Communication (NFC). The user that carries the device equipped for Bluetooth communication or NFC with him or her, will always be warned of drug intake times, regardless of where they are relative to the device according to the invention, of course within reach of the communication system. Also by means of Bluetooth communication or NFC, external alert signs can be activated, such as an alert by a mobile phone or other device that is equipped with NFC.

The devices according to the invention thus provide a simple solution for cases where several medicines with different intake schedules should be taken. The physician/pharmacist simply programs an individual device for each individual medicine, so the patient only needs to observe the relevant alerts. In hospitals and other healthcare facilities where the nursing staff is responsible for the intake of medication, the devices according to the invention are very useful because it is easy to see which medication has been taken, and which medication has not yet been administered.

Although the invention is extensively illustrated by examples related to ingestion of medicines, the invention is not limited to this application. The invention is equally applicable to other regular activities such as doing exercises etc. Nor is the invention limited to the implementation in the form of a thin flexible sticker. Versions in the shape of a bracelet, or attached to a bracelet, or as a pendant on a necklace, etc. are also possible. Likewise, the attachment by means of an adhesive layer serves only as a non-restrictive example of an implementation of the invention. Other fasteners such as magnetic attachment or fixtures are equally possible within the scope of the present invention. Also, the device according to the invention can be integrated, for example in the packaging of a product. LEDs are mentioned as an example of a signaling device, but also other signaling devices such as electronic paper, an LCD, an OLED, electro chrome displays, light emitting polymers, etc. are included within the scope of the invention as an implementation of the alert device. It is also possible for a device according to the invention to include signals that can have other meanings, such as a signal to indicate low battery voltage or a signal indicating that the intake regimen is poorly observed. Also, other useful data can be stored in the memory of a device according to the invention, such as data regarding the user, the prescribing authority, the prescribed medicine, etc.

The preferred main programmable electronic circuit according to the invention can be reprogrammed to add features of functionality beyond its original intention. Two examples of such features have been given in the description.

One feature adds support for users travelling to a different time zone. This change in time zone (for example +5 hours) could for example be entered by pressing the switch first for 5 seconds to indicate a change is time zone should be made, and then pressing the switch 5 times to indicate the change is 5 hours. Of course there are other methods imaginable, including entering this information in a specialized software program and wirelessly transmitting the necessary adjustments to the device.

Another example of a feature is to use the device as a countdown timer for taking medications at a specific time before or after a meal. For example, is a patient should take his or her medicines 45 minutes after each meal, the device according to the invention can be programmed in such a way that, if the patient pushes the switch on the device during a meal, the device will count down from that moment and provide an alert signal 45 minutes later. Similarly, when the patient is instructed to take medicines 45 minutes before a meal, the device can be programmed to be operated when the patient is hungry, after which the device will provide an alert signal 45 minutes later indicating that the patient is allowed to start eating his/her meal.

Even further applications of the device according to the invention include, but are not limited to, means to alert users to water their plants or feed their pets in a way similar to alerting users to take medication. Clearly the potential functionality is the device according to the invention is virtually limitless with regard to issuing alert signals as a reminder to perform a recurring act.

Thus, the invention has been described by reference to certain embodiments discussed above. It will be recognized that the embodiments described are susceptible to various modifications and alternative forms well known to those of skill in the art.

What is claimed is:

1. A method for issuing alert signals as a reminder to perform a recurring act, the method comprising:

providing a device comprising a programmable electronic circuit, a real-time clock, an electrical power source, a programmable memory for storing a signaling pattern, a control switch, and an alert body controlled by the electronic circuit, programming the device with a series of alert times or an alert signaling pattern, determining a first alert time based at least in part on the series of alert times or the alert signaling pattern, issuing a first signal from the alert body, issuing a second signal from the alert body at the first alert time, the second signal being distinguishable from the first signal, and determining a next alert time upon activation of the control switch, wherein the next alert time is based at least in part on the series of alert times or the alert signaling pattern, and the time elapsed between the first alert time and activation of the control switch.

2. The method according to claim 1, wherein the next alert time is adjusted to delay the alert time, based on the time elapsed between the first alert time and activation of the control switch.

3. The method according to claim 1, further comprising issuing a third signal from the alert body if the control switch is not activated after a predetermined time following the first alert time, wherein the third signal is distinguishable from the first and second signals.

4. The method according to claim 1, wherein the recurring act is the intake of medicine and the alert times correspond to the optimal times for the intake of medicine.

5. The method according to claim 1, wherein the electronic circuit operates according to software stored in the programmable memory, and is adapted for adjusting the series of alert times or the alert signaling pattern in accordance with travelling to different time zones.

6. The method according to claim 1, wherein the alert signaling pattern comprises gradually increasing and/or decreasing intervals of alert signaling times.

7. The method according to claim 1, wherein the next alert time is adjusted to delay the alert time, based on the time elapsed between the first alert time and activation of the control switch if the time elapsed is greater than a predetermined time.

8. The method according to claim 7, further comprising issuing a third signal from the alert body if the control switch is not activated after a predetermined time following the first alert time, wherein the third signal is distinguishable from the first and second signals.

9. A programmable device for issuing alert signals as a reminder to perform a recurring act, the device comprising a programmable electronic circuit, a real-time clock, an electrical power source, a control switch, and an alert body controlled by the electronic circuit, and a programmable memory for storing a series of alert times or an alert signaling pattern, wherein the electronic circuit is configured to:

determine a first alert time based at least in part on the series of alert times or the alert signaling pattern, activate the alert body for issuing a first signal from the alert body, detect the first alert time and activate the alert body for issuing a second signal from the alert body, the second signal being distinguishable from the first signal, and determine a next alert time upon activation of the control switch, the next alert time being based at least in part on the series of alert times or the signaling pattern, and the time elapsed between the first alert time and activation of the control switch.

10. The programmable device according to claim 9, wherein the electronic circuit includes at least one computer interface for programming the device.

11. The programmable device according to claim 9, wherein the electronic circuit is adapted for storing data relating to times at which the control switch has been activated and a computer interface for retrieving the data.

12. The programmable device according to claim 9, wherein the electronic circuit operates according to software stored in the programmable memory, and is adapted for replacing, updating or reprogramming the software via the computer interface.

13. The programmable device according to claim 9, wherein the electronic circuit operates according to software stored in the programmable memory, and is adapted for adjusting the series of alert times or the alert signaling pattern in accordance with travelling to different time zones.

14. The programmable device according to claim 9, wherein the alert signaling pattern comprises gradually increasing and/or decreasing intervals of alert signaling times.

* * * * *